J. LANE.
Plow and Cultivator.
No. 82,130.
Patented Sept. 15, 1868.
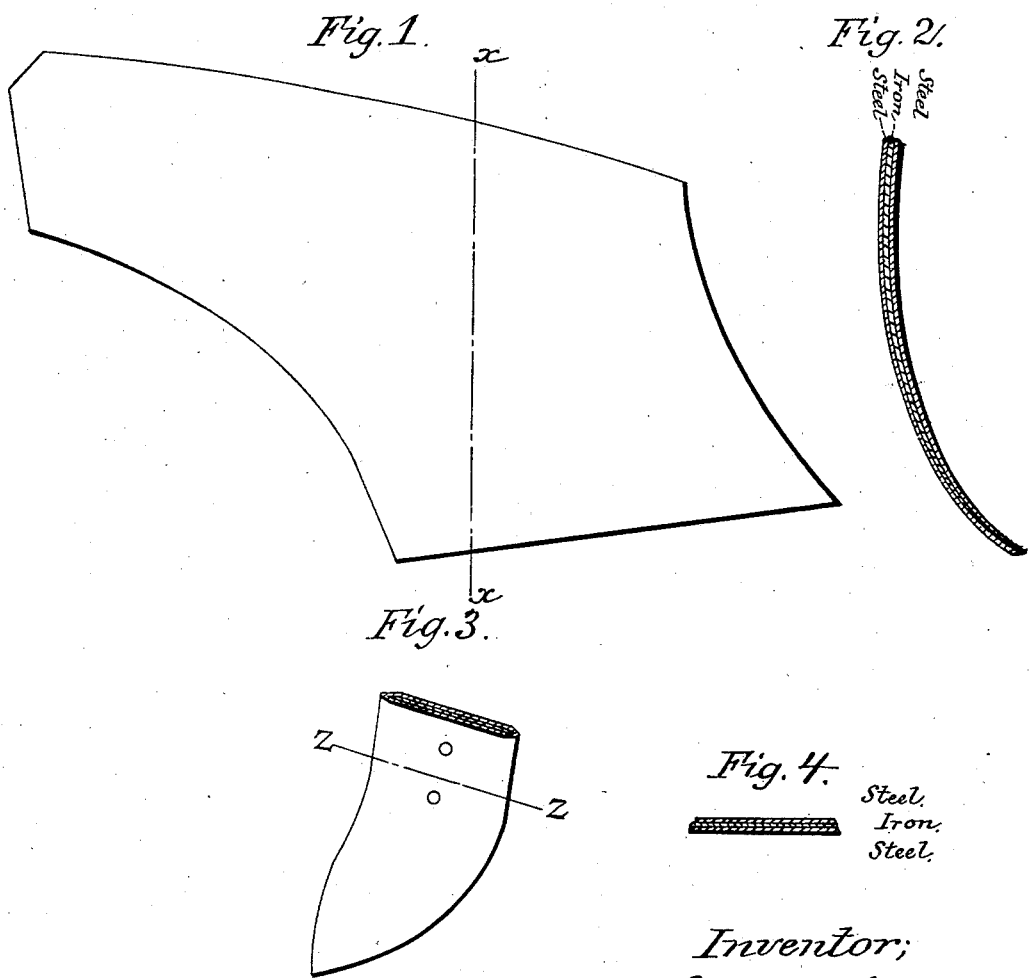

UNITED STATES PATENT OFFICE.

JOHN LANE, OF CHICAGO, ILLINOIS.

IMPROVEMENT IN PLOWS AND CULTIVATORS.

Specification forming part of Letters Patent No. 82,130, dated September 15, 1868.

*To all whom it may concern:*

Be it known that I, JOHN LANE, of Chicago, in the county of Cook and State of Illinois, have invented certain new and useful Improvements in the Manufacture of Plows and Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to an improvement in the construction of plows and cultivators of that peculiar kind used in the prairie-soils of the West; and the invention consists in constructing the mold-boards and shares of metal plates, having a central layer of iron, with a layer on both exterior surfaces of cast steel, as hereinafter more fully explained.

In the drawings, Figure 1 represents a face view of a mold-board for a plow, and Fig. 2 represents a cross-section of the same on the line *x x* of Fig. 1. Fig. 3 is a perspective view of a cultivator-tooth; and Fig. 4 represents a cross-section of the same, taken on the line *z z* of Fig. 3.

It is well known to the manufacturers of agricultural implements, and western farmers and dealers, that, owing to the peculiar nature of the western soils, the ordinary cast-iron plow, generally used in the eastern States, and also in Europe, cannot be used at the West, for the reason that the soil, being composed of a fine, rich loam, with a large admixture of decayed vegetable matter, is adhesive in its nature, and sticks to the mold-board of a cast-iron plow, so that the latter will not scour or become polished, and hence will not permit the furrow-slice to pass freely over it, as is necessary in order to turn the furrow.

Heretofore these plows have been made of plates of steel, rolled out of the requisite thickness and width, in the usual manner, and then cut into pieces of the proper size and form to make the mold-board, share, and land-side, cultivator-teeth being cut from the steel plates in a similar manner. The plates, both for plows and cultivators, are then shaped, tempered, and finally ground or polished before being used.

Experience has demonstrated that the implements thus made were too soft, and soon wore out, and that the harder they were the better they worked and the longer they lasted; and hence it has long been a study among inventors and manufacturers to devise some efficient means of producing plows and cultivators with plates having an extremely hard surface, and which would not spring or warp in tempering, and which would not be so brittle as to be easily cracked or broken. Many plans have been devised and patented with this object in view; but none have proved successful in practice. In order to give the required smoothness and hardness to the surface, many different kinds of baths have been used for tempering the plates; they have had their wearing-surface enameled; they have been made of glass in numerous ways; and, finally, they have been made of a front surface of steel welded to a backing or layer of iron.

In attempting to make plows on these various plans, unexpected difficulties were encountered, which not only rendered their manufacture extremely difficult, but the articles themselves nearly or quite useless when made, and hence the ordinary plan of constructing them of common steel plates still prevails as the almost universal plan, except where it is being supplanted by my invention, which is now coming rapidly into use.

In constructing the plates of the steel having an iron backing the desired object, it was thought, would be accomplished, as the steel would furnish a hard and smooth wearing-surface, while the iron backing would render the plate tough and strong, and therefore not liable to be easily cracked or broken. It was found, however, upon trial, that this plan would not work, for the reason that, after the mold-board or share was bent to the required form, the two metals were differently affected by the process of tempering, thus warping and bending the plates out of shape, and thereby spoiling the plow. Besides, as the ordinary plate-steel was used, it could not be made any harder than the ordinary steel-plate.

To remedy these difficulties and produce a plow or cultivator plate that shall have an extremely hard and durable surface, and which, at the same time, shall not be liable to crack or break, nor warp in tempering, is the object of my invention, and to accomplish this desirable result I proceed as follows:

I first cause to be manufactured a plate having a central layer of iron or soft semi-steel, with an outer layer, on each face, of fine cast-steel. These plates are made as follows: An ingot of iron is first heated to a welding heat and then suspended in a suitable cast-iron mold, so as to leave a vacant space all around between the sides of the ingot and of the mold, which space is then filled with cast-steel, melted in crucibles and poured into the mold, when it immediately unites with the hot-iron ingot, thus forming a larger ingot having a central core of iron surrounded by cast-steel. The ingot thus formed is afterward rolled out into a plate, in the same manner that steel plates are ordinarily made. From the compound plates thus formed I manufacture my improved plow and cultivator plates, in the same manner that they are ordinarily made of the common steel plates. By thus making them with a central layer of iron they are rendered tough and prevented from breaking, while the cast-steel surface can be so hardened as to render it extremely hard, enabling it to receive a much higher polish than the ordinary steel plow, and thus to work much better and wear much longer.

By having the steel on both sides of the iron the mold-boards and shares, after being bent to the required form, can be tempered without warping or changing their form, as the steel layers on the opposite sides of the iron exactly counteract each other in any tendency which either may have to warp in either direction, the relative position of the layers of steel and iron being clearly shown in Figs. 2 and 4.

By this method of constructing plows and cultivators I am enabled to produce a very superior article, and one that is specially adapted to the wants of the farmers of the great West.

Since perfecting my invention, I have learned that compound bars of iron and cast-steel, constructed in a similar manner, were described as having been invented in England for the manufacture of edge-tools, and therefore I do not claim the bars themselves as my invention; but,

Having thus fully described my invention, what I do claim is—

The improvement herein described in the manufacture of plows and cultivators—that is to say, the making of them of metal plates, having a central layer of soft iron or steel, with exterior layers of cast-steel, substantially as and for the purposes described.

JOHN LANE.

Witnesses:
GEO. H. LAUGHTON,
JULIUS A. LANE.